United States Patent
Tokuyama et al.

(10) Patent No.: US 6,821,103 B2
(45) Date of Patent: Nov. 23, 2004

(54) INJECTION MOLDING MACHINE

(75) Inventors: Harumichi Tokuyama, Odawara (JP); Makoto Nishizawa, Numazu (JP); Jun Koike, Shizuoka-ken (JP); Akihide Okube, Numazu (JP); Fumiyuki Katoh, Shizuoka-ken (JP); Hiroyuki Onuma, Numazu (JP); Katsuhito Ogura, Numazu (JP); Katsuyoshi Kido, Numazu (JP)

(73) Assignee: Toshiba Machines Co., Ltd., Tokyo (JP)

( * ) Notice: Subject to any disclaimer, the term of this patent is extended or adjusted under 35 U.S.C. 154(b) by 1 day.

(21) Appl. No.: 10/265,109

(22) Filed: Oct. 7, 2002

(65) Prior Publication Data

US 2003/0091685 A1 May 15, 2003

(30) Foreign Application Priority Data

| Nov. 15, 2001 | (JP) | ................................. | 2001-350419 |
| Mar. 6, 2002 | (JP) | ................................. | 2002-060791 |
| Apr. 23, 2002 | (JP) | ................................. | 2002-120761 |

(51) Int. Cl.$^7$ ............................................. B29C 45/77
(52) U.S. Cl. ...................................... 425/145; 425/574
(58) Field of Search ............................... 425/145, 150, 425/574

(56) References Cited

U.S. PATENT DOCUMENTS

| 4,895,505 A | 1/1990 | Inaba et al. |
| 6,364,650 B1 * | 4/2002 | Emoto .......................... 425/145 |
| 6,368,095 B1 * | 4/2002 | Chang .......................... 425/145 |
| 6,371,748 B1 * | 4/2002 | Hara ............................ 425/145 |
| 6,562,261 B2 * | 5/2003 | Onishi .......................... 425/145 |
| 6,565,781 B2 * | 5/2003 | Konno .......................... 425/145 |

FOREIGN PATENT DOCUMENTS

| DE | 299 00 330 U1 | 5/1999 |
| EP | 0 280743 | 9/1987 |
| JP | 57-20336 | 2/1985 |
| JP | 63-60720 | 3/1988 |
| WO | 88/10562 | 3/1988 |

* cited by examiner

*Primary Examiner*—Tim Heitbrink
(74) *Attorney, Agent, or Firm*—Pillsbury Winthrop LLP

(57) ABSTRACT

A screw is incorporated in a heating barrel, and the tail end of the screw is rotatably supported by the front surface of an intermediate plate. Behind the intermediate plate, two linear motor units are connected in parallel and arranged around the shaft of the screw to form axial symmetry. The output shafts of the linear motor units are connected to the tail end of a driving shaft through a common connecting arm, and the leading end of the driving shaft is fixed to the rear surface of the intermediate plate. Each of the liner motor units is constituted by a plurality of voice coil linear motors connected in parallel. Each of the linear motor units can be independently controlled. Voice-coil linear motors to be used are selected according to the type of product to be manufactured.

5 Claims, 3 Drawing Sheets

INJECTION MOLDING MACHINE

CROSS-REFERENCE TO RELATED APPLICATIONS

This application is based upon and claims the benefit of priority from the prior Japanese Patent Applications No. 2001-350419, filed Nov. 15, 2001, No. 2002-060791, filed Mar. 6, 2002; and No. 2002-120761, filed Apr. 23, 2002, the entire contents of all of which are incorporated herein by reference.

BACKGROUND OF THE INVENTION

1. Field of the Invention

The present invention relates to an injection molding machine in which a linear motor is used as a driving source of a linear motion member and, particularly, to the construction of a mechanism to axially drive a screw in an injection unit of an electric injection molding machine.

2. Description of the Related Art

In an injection molding machine which performs molding by injecting molten resin into dies, linear drive mechanisms are used in many places such as an injection unit which axially moves a screw in a heating barrel, a die clamping unit which performs opening and closing of the dies and die clamping, and an ejector which pushes out a product from the dies. When linear motions are electrically performed, a mechanism which converts the rotational motion of a motor to a linear motion by means of a ball screw has hitherto been widely used.

In contrast, Jpn. Pat. Appln. KOKAI Publication No. 63-60720 discloses an injection molding machine in which an alternating-current linear motor is used as a driving source of a linear motion member. Because the linear motion member is directly driven by using the alternating-current linear motor, a mechanism to convert a rotational motion to a linear motion becomes unnecessary and hence the construction of a linear drive mechanism can be simplified.

However, the following problems arise when an alternating-current linear motor is used as a driving source of a linear motion member of an injection molding machine:

(a) In general, an alternating-current linear motor has a large total length in the axial direction in comparison with a ball screw and, therefore, this results in a large drive mechanism and a cost increase.

(b) A linear motor with an iron core coil is used to obtain a large thrust. However, a strong mechanical structure becomes necessary because of the generation of a magnetic attraction which is as much as several times the thrust and, therefore, this results in an increase in the size of the drive mechanism, a weight increase, an increase in complexity and a cost increase.

(c) Due to the large magnetic attraction, electrical phase angle positioning is difficult and it is impossible to reduce phase differences. Such phase differences cause disturbances and pose the problems that it is difficult to increase gains and that vibrations occur.

BRIEF SUMMARY OF THE INVENTION

The present invention was made in view of the above-described problems in the driving source of a linear motion member of a conventional injection molding machine. The object of the invention is to provide an injection molding machine in which a drive mechanism that is compact and has a large thrust is used as a driving source of a linear motion member. Particularly, the object of the invention is to provide an injection molding machine in which such a drive mechanism is used as a driving source to axially drive a screw of an injection unit.

An injection molding machine of the invention comprises: a heating barrel having a nozzle at the leading end thereof and being connected to the rear surface of dies through the nozzle; a screw being incorporated in the heating barrel and injecting molten resin into the dies by advancing in the heating barrel; and one or more than two voice-coil linear motors being connected to the tail end of the screw and axially driving the screw in the heating barrel.

In an injection molding machine of the invention, a voice-coil linear motor, which is widely used as the source of vibration in a speaker, is used as a driving source of the screw of an injection unit. A voice-coil linear motor, which is a direct-current linear motor, is constituted by a coil having an axis parallel to the driving direction and a magnet arranged around (or inside) the coil. When a direct current flowing in the coil interacts with the magnetic field generated by the magnet, a force is generated between the magnet and the coil and the magnet (hence, a moving body connected to the magnet) moves along the axis of the coil. The thrust of a voice-coil linear motor is determined by the current flowing in the coil.

A voice-coil linear motor has the following features:

(a) Because of the high utilization rate of magnetic flux in comparison with an alternating-current linear motor, a larger thrust can be obtained with the same size. Therefore, the size and the total length are small. Besides, it is easy to increase rigidity and the construction is simple.

(b) Because the coil and the magnet are coaxial, an imbalance in magnetic attraction is less apt to occur. For this reason, a construction to resist magnetic attraction is not required and, therefore, a light, highly rigid construction is possible and manufacturing at low cost is possible.

(c) Because of the direct-current motor, there is no phase difference.

(d) When the magnet is provided on the moving side the coil is provided on the fixed side, in this case it is unnecessary to consider the flexibility of electric wiring.

Therefore, by using a voice-coil linear motor as a driving source of the screw of an injection unit in an injection molding machine, the construction of the injection unit can be simplified and the total length of the injection unit can be made short.

When a large thrust is required in an injection molding machine of the invention, a plurality of voice-coil linear motors are connected to the tail end of the screw in parallel and arranged around the axis of the screw to form axial symmetry.

By arranging the voice-coil linear motors like this, the generation of a couple of forces around the shaft of the screw can be prevented. This removes the main factors in excessive loads on the connections between the linear motors and the screw and on various parts of the linear motors and, therefore, the construction of these parts can be simplified and the weight of these parts can be reduced.

In this case, preferably, the voice-coil linear motors are configured in such a manner that each of the motors can be independently controlled.

By configuring the voice-coil linear motors like this, it is possible to appropriately select the number of linear motors according to the type of product to be manufactured. This permits fine control of thrust during injection and can save electric power consumption.

Incidentally, in the above-described injection molding machine, it is also possible to use, instead of each of the voice-coil linear motors, a linear motor unit which is constituted by a plurality of voice-coil linear motors connected in parallel. As with the foregoing case, these linear motor units are also connected to the tail end of the above-described screw in parallel and arranged around the axis of the screw to form axial symmetry.

Also in this case, preferably, the linear motor units are configured in such a manner that each of the linear motor units can be independently controlled.

Incidentally, it is also possible to use the voice-coil linear motor as a driving source of a plunger in an injection unit of a plunger preplasticating type, a driving source of an ejector which pushes out a product from dies, a driving source of a movable platen of a die clamping unit which performs the opening and closing of dies and die clamping, etc., in addition to a driving source of a screw in an injection unit of an in-line screw type as described above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Embodiment 1

Figure 1:
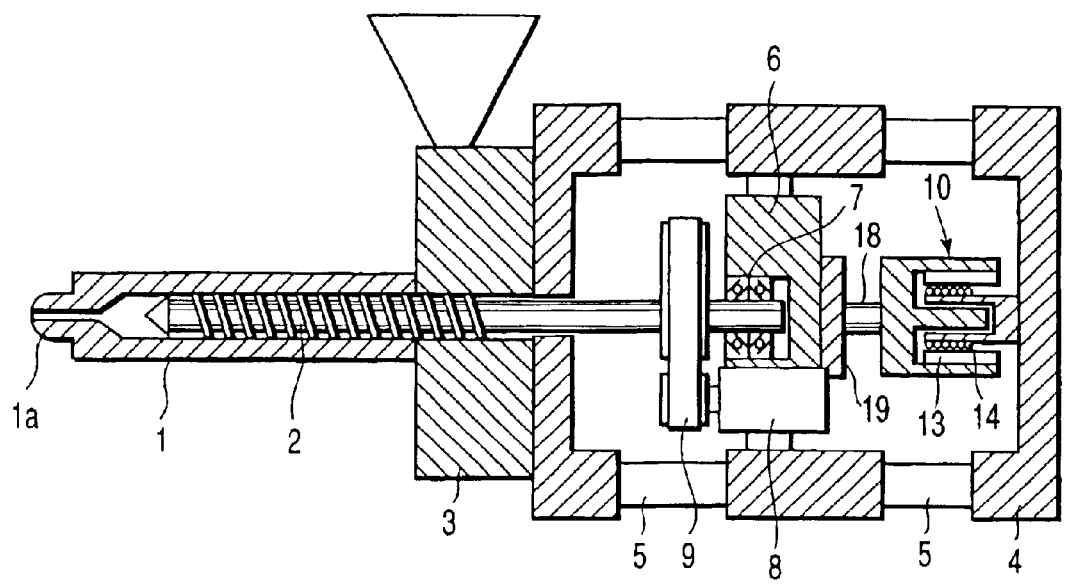
FIG. 1 is a schematic configuration diagram of an example of an injection unit of an injection molding machine according to the invention.

FIG. 1 shows an example of an injection unit of an injection molding machine according to the invention. In this example, a voice-coil linear motor is used as a driving source to axially drive the screw in an injection unit of an in-line screw type. In the figure, the numeral 1 denotes a heating barrel, the numeral 2 a screw, the numeral 3 a front plate, the numeral 4 a rear plate, the numeral 5 a tie bar, the numeral 6 an intermediate plate, and the numeral 10 a voice-coil linear motor.

The heating barrel 1 is, at the leading end thereof (the left end in the figure), connected to the rear surface of dies (not shown) through a nozzle 1a. The leading end side of the screw 2 is housed in the barrel 1. The tail end of the heating barrel 1 is supported by the middle of the front plate 3. Behind the front plate 3 is arranged the rear plate 4 opposite to the front plate 3. Four tie bars 5 span the space between the front plate 3 and the rear plate 4, which are connected to each other through these tie bars 5.

Between the front plate 3 and the rear plate 4 is disposed the intermediate plate 6. Through holes are provided at four corners of the peripheral edge portion of the intermediate plate 6, and the tie bars 5 pass through these through holes. The intermediate plate 6 can move in a back-and-forth direction (a left-and-right direction in the figure) while being guided by the tie bars 5.

A bearing 7 is built into the middle of the intermediate plate 6 and the tail end of the screw 2 is supported by the bearing 7. A servomotor 8 for charging is mounted on the intermediate plate 6. The shaft of the servomotor 8 is connected to a portion near the tail end of the screw 2 through a pulley with a timing belt 9. The intermediate plate 6 is connected to the front surface of the rear plate 4 through a load cell 19 and the voice-coil linear motor 10.

Figure 2:
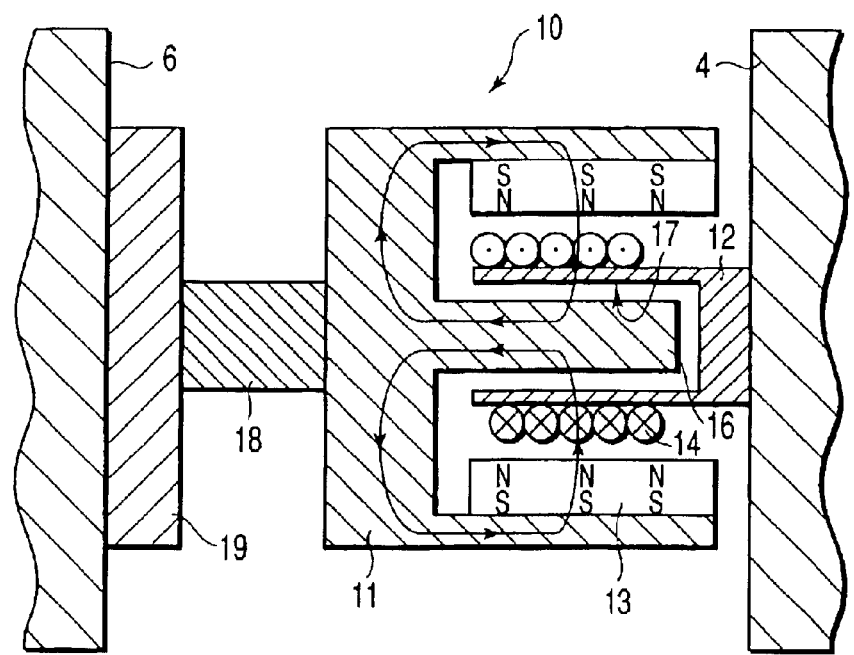
FIG. 2 is an enlarged sectional view of a voice-coil linear motor portion of the injection unit shown in FIG. 1.

FIG. 2 shows an enlarged sectional view of a voice-coil linear motor portion in the above-described injection unit. The voice-coil linear motor 10 is constituted by a casing 11, a core 12, magnets 13, coils 14, etc.

The tail end of the core 12 is fixed to the front surface of the rear plate 4. The coils 14 are wound around the core 12. A hollow portion is formed in the interior of the casing 11 and this hollow portion opens toward the tail end side of the casing 11. The magnets 13 are fixed to the inner peripheral surface of this hollow portion. The above-described coils 14 and magnets 13 are disposed around a common shaft and opposed to each other through a small gap. The casing 11 has a guide pin 16 in the center of the hollow portion, and a guide hole 17 corresponding to the guide pin 16 is formed in the center of the core 12. A driving shaft 18 protrudes forward from the front end surface of the casing 11. The leading end of the driving shaft 18 is fixed to the rear surface of the intermediate plate 6 through the load cell 19.

Magnetic fluxes of the magnets 13 form magnetic circuits which cross the coils 14 as indicated by the arrows in the figure. When currents flow through the coils 14, thrusts are generated between the magnetic fluxes by the magnets 13 according to Fleming's left-hand rule. Incidentally, in the case of the directions of the magnetic fluxes and currents shown in FIG. 2, thrusts in a forward direction (a left direction) act on the casing 11.

In the above-described injection unit (FIG. 1), by rotating the screw 2 by means of the servomotor for charging 8, resin raw material is introduced into the heating barrel 1 and melted. At this time, a back pressure is applied to the molten resin in the heating barrel 1 by means of the voice-coil linear motor 10. After a predetermined amount of molten resin is stored in the heating barrel 1, the intermediate plate 6 is advanced by means of the voice-coil linear motor 10 and the screw 2 is advanced in the heating barrel 1. As a result, the molten resin is injected from the heating barrel 1 to the interior of the dies.

Embodiment 2

Figure 3:
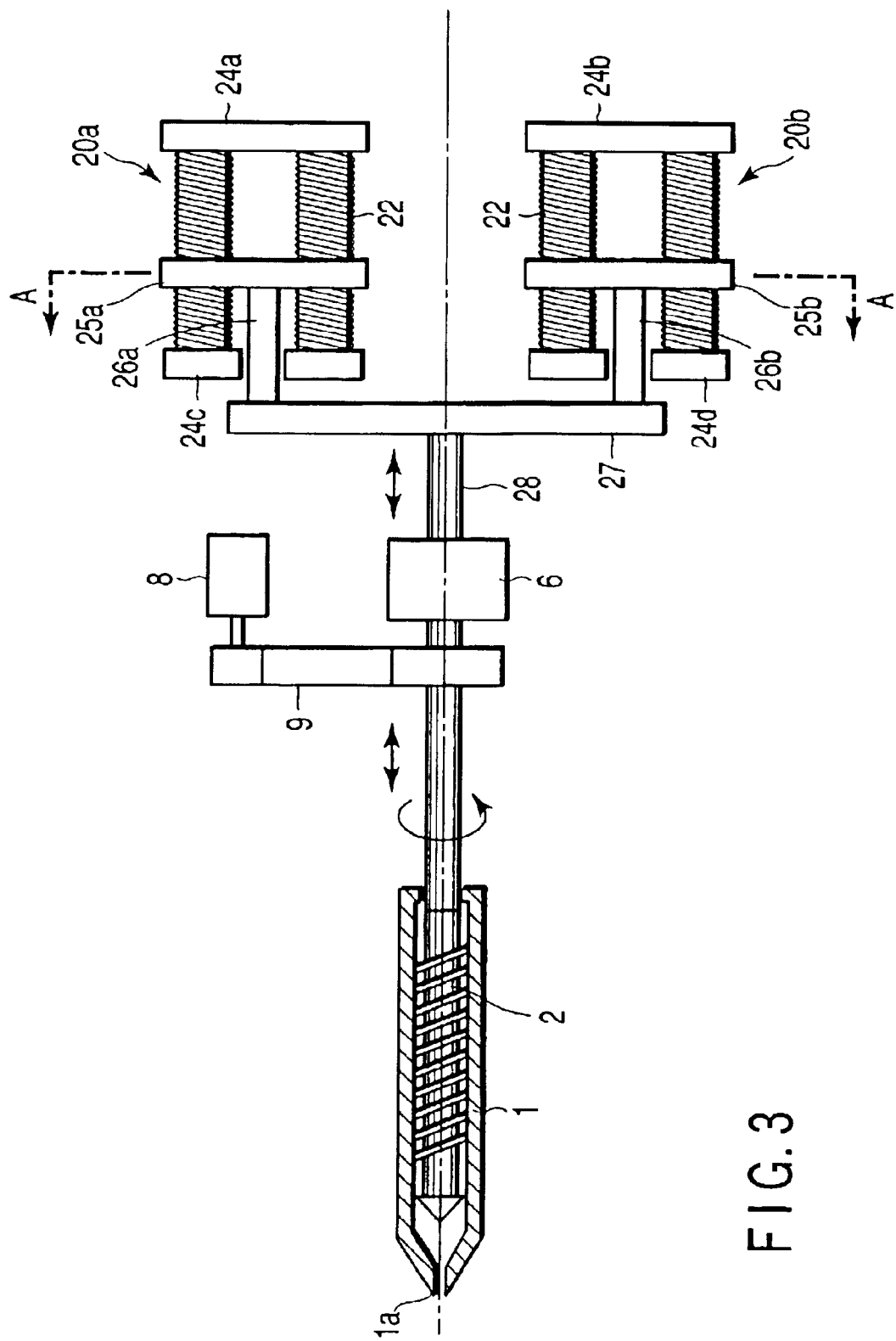
FIG. 3 is a schematic arrangement diagram of another example of an injection unit of an injection molding machine according to the invention.

FIG. 3 shows another example of an injection unit of an injection molding machine according to the invention. In the figure, the reference numerals 20a and 20b each denote a linear motor unit. Incidentally, in the figure, the front plate, rear plate, tie bars (3, 4, 5 in FIG. 1), etc. are omitted to make it easy to understand the structure.

A heating barrel 1 is, at the leading end thereof (the left end in the figure), connected to the rear surface of dies (not shown) through a nozzle 1a. A screw 2 is housed in the barrel 1. The tail end of the heating barrel 1 is rotatably supported by the middle of the front surface of an intermediate plate 6. A servomotor 8 is connected to a portion near the tail end of the screw 2 through a pulley with a timing belt 9. This servomotor 8 is used to rotate the screw 2 in the heating barrel 1.

Two linear motor units 20a, 20b are connected in parallel behind the intermediate plate 6 and arranged around the axis of the screw 2 to form axial symmetry. Each of the linear motor units 20a, 20b is fixed to a base (not shown) of the injection molding machine through fixed plates 24a to 24d. The leading ends of output shafts 26a, 26b of the linear motor units 20a, 20b are connected to a common connecting arm 27. The tail end of a driving shaft 28 is connected to the middle of the connecting arm 27, and the leading end of the driving shaft 28 is fixed to the rear surface of the intermediate plate 6.

Figure 4:
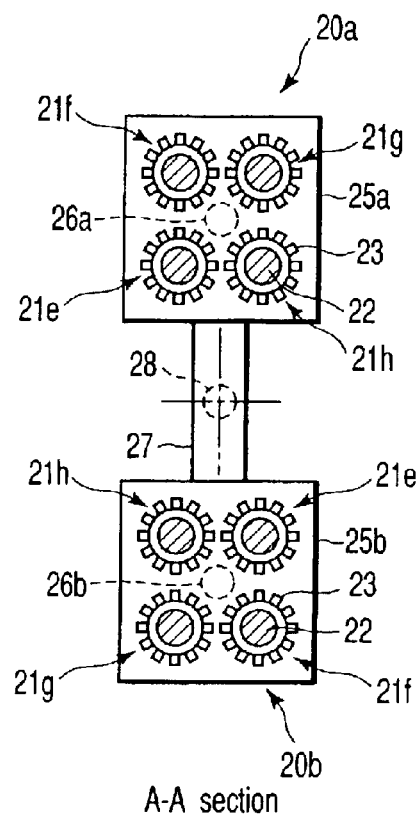
FIG. 4 is a sectional view showing the arrangement of the voice-coil linear motors in the injection unit shown in FIG. 3.

FIG. 4 shows a sectional view taken along the line A—A of FIG. 3. This figure corresponds to a sectional view in a direction perpendicular to the shafts of the linear motor units 20a, 20b. Each of the linear motor units 20a, 20b is constituted by four voice-coil linear motors 21e to 21h connected in parallel. Each of the voice-coil linear motors 21e to 21h that constitute one linear motor unit 20a and the corresponding voice-coil linear motor 21e to 21h that constitute the other linear motor unit 20b are arranged around the axis of the screw 2 (FIG. 3) to form axial symmetry with each other.

Each of the voice-coil linear motors 21e to 21h is constituted by a pair of a coil 22 and magnet 23. Each coil 22 has an axis parallel to the driving direction (i.e., the axis of the screw 2). The four coils 22 belonging to each of the linear motor units 20a, 20b are arranged around the output shafts 26a, 26b to form axial symmetry. Each magnet 23 is attached to a moving body 25a, 25b. Four through holes are formed in each of the moving bodies 25a, 25b and the coil 22 passes through each through hole. Each magnet 23 is arranged along the inner periphery of each through hole in such a manner as to surround the coil 22 via a small gap. When a direct current flowing in the coil 22 interact with the magnetic field generated by the magnet 23, a force is generated between the magnet 23 and the coil 22, and the moving body 25a, 25b moves along the axis of the coil 22.

In the above-described injection unit (FIG. 3), by rotating the screw 2 by means of the servomotor for charging 8, resin raw material is introduced into the heating barrel 1 and melted. At this time, a back pressure is applied to the molten resin by means of the linear motor units 20a, 20b. After a predetermined amount of molten resin is stored in the heating barrel 1, the intermediate plate 6 is advanced by means of the linear motor units 20a, 20b and the screw 2 is advanced in the heating barrel 1. As a result, the molten resin is injected from the heating barrel 1 to the interior of the dies.

In the above-described injection molding machine, the voice-coil linear motors 21e to 21h that constitute each of the linear motor units 20a, 20b can be independently controlled. However, when used simultaneously, these voice-coil linear motors 21e to 21h can be brought into synchronization with each other. Therefore, according to the type of product to be manufactured, by selecting linear motors to be used symmetrically with respect to the driving shaft 28, it is possible to adjust the thrust to an appropriate range and to perform fine control of the injection pressure. Furthermore, when possible, linear motors to be used are selected symmetrically also with respect to the output shafts 26a, 26b.

Incidentally, although two linear motor units are used in the above-described example, the number of linear motor units to be used can be increased as required. Even in a case where an odd number of linear motor units, for example, three or five linear motor units, is used, axial symmetry can be formed by arranging the linear motor units at the same angle around the axis of the screw 2. Also, when an even number of at least four linear motor units is used, it is not always necessary that the control system of each linear motor unit be independent for each voice-coil linear motor 21 in each linear motor unit. For example, it is also possible just to control each linear motor unit independently.

Embodiment 3

Figure 5:
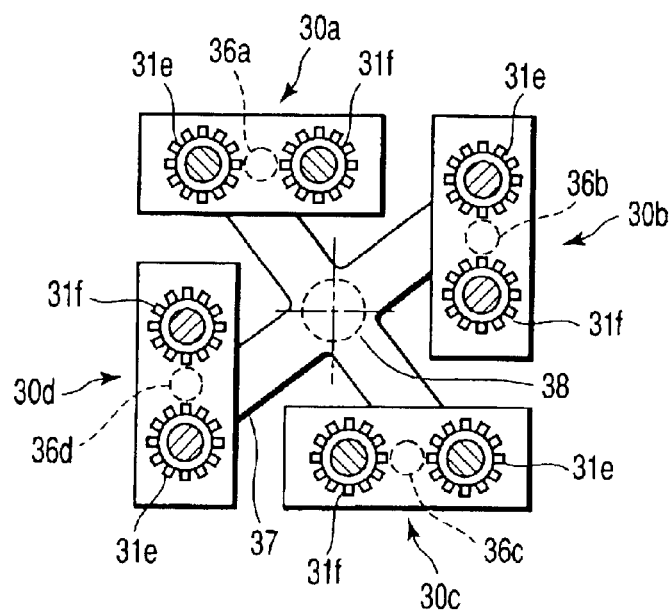
FIG. 5 is a view showing another example of the arrangement of the voice-coil linear motors in an injection unit of an injection molding machine according to the invention.

FIG. 5 shows another example of the arrangement of the voice-coil linear motors in an injection unit of an injection molding machine according to the invention. As with FIG. 4, this figure corresponds to a sectional view in a direction perpendicular to the shafts of the linear motor units 30a to 30d. Each of the linear motor units 30a to 30d is constituted by two voice-coil linear motors 31e and 31f connected in parallel. Each of the voice-coil linear motors 31e and 31f that constitute the linear motor units 30a to 30d are arranged around the axis of the screw 2 (FIG. 3) to form axial symmetry. The leading ends of the output shafts 36a to 36d of the linear motor units 30a to 30d are connected to a common connecting arm 37. The tail end of the driving shaft 38 is connected to the middle of the connecting arm 37, and the leading end of the driving shaft 38 is connected to the tail end of the screw 2 (FIG. 3) through an intermediate plate 6 (FIG. 3).

Incidentally, in the above-described examples, a voice-coil linear motor is used as the driving source of a screw in an injection unit of in-line screw type. However, the above-described voice-coil linear motor can also be used as the driving source of another linear motion member of an injection molding machine as described below:

(a) Driving source of a plunger in an injection unit of a plunger preplasticating type or screw preplasticating type (i.e., an injection unit in which resin melting is performed in a separately provided heating barrel).

(b) Driving source of an ejector pin of an ejector which pushes out a product from a die surface.

(c) Driving source of a movable platen of a die clamping unit which performs the opening and closing of dies and die clamping.

Furthermore, in the above-described examples, the magnet of a voice-coil linear motor is provided on the moving side and the coil is provided on the fixed side. Conversely, however, the coil may be provided on the moving side and the magnet on the fixed side. However, in the case where the coil is provided on the moving side, it is necessary to provide a structure which enables an electric wire to be moved together with it (for example, a cable drag chain).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An injection molding machine comprising:
   a heating barrel having a nozzle at the leading end thereof and being connected to the rear surface of dies through the nozzle;
   a screw being incorporated in the heating barrel and injecting molten resin into the dies by advancing in the heating barrel; and one or more than two voice-coil linear motors being connected to the tail end of the screw and axially driving the screw in the heating barrel.

2. An injection molding machine according to claim 1, wherein a plurality of said voice-coil linear motors are connected to the tail end of said screw in parallel and arranged around the axis of said screw to form axial symmetry.

3. An injection molding machine according to claim 1, wherein each of said voice-coil linear motors can be independently controlled.

4. An injection molding machine according to claim 1, wherein a plurality of linear motor units are connected to the tail end of said screw in parallel and arranged around the axis of said screw to form axial symmetry, and each of said linear motor units is constituted by a plurality of said voice-coil linear motors which are connected in parallel.

5. An injection molding machine according to claim 4, wherein each of said linear motor units can be independently controlled.

* * * * *

UNITED STATES PATENT AND TRADEMARK OFFICE
CERTIFICATE OF CORRECTION

PATENT NO. : 6,821,103 B2
DATED : November 23, 2004
INVENTOR(S) : Harumichi Tokuyama et al.

It is certified that error appears in the above-identified patent and that said Letters Patent is hereby corrected as shown below:

<u>Title page,</u>
Item [73], Assignee, replace "Toshiba Machines Co, Ltd." with -- Toshiba Machine Co., Ltd. --.

Signed and Sealed this

Seventeenth Day of May, 2005

JON W. DUDAS
*Director of the United States Patent and Trademark Office*